(12) United States Patent
Vanganuru et al.

(10) Patent No.: US 8,095,168 B2
(45) Date of Patent: Jan. 10, 2012

(54) METHOD AND APPARATUS FOR PERFORMING CLOSED-LOOP TRANSMIT POWER CONTROL FOR FRACTIONAL DEDICATED PHYSICAL CHANNEL

(75) Inventors: Kiran K. Vanganuru, King of Prussia, PA (US); William E. Lawton, Parker Ford, PA (US); Gregory S. Sternberg, Mount Laurel, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 386 days.

(21) Appl. No.: 12/392,539

(22) Filed: Feb. 25, 2009

(65) Prior Publication Data

US 2009/0312048 A1 Dec. 17, 2009

Related U.S. Application Data

(60) Provisional application No. 61/031,465, filed on Feb. 26, 2008.

(51) Int. Cl.
  $H04B\ 7/185$ (2006.01)
(52) U.S. Cl. .......... 455/522; 455/69; 370/318; 370/252; 370/332
(58) Field of Classification Search .................... 455/69, 455/522; 370/318, 252, 332
See application file for complete search history.

(56) References Cited

U.S. PATENT DOCUMENTS

| | | | |
|---|---|---|---|
| 6,654,613 B1 * | 11/2003 | Maeng et al. | 455/522 |
| 6,983,166 B2 * | 1/2006 | Shiu et al. | 455/522 |
| 7,376,438 B2 * | 5/2008 | Shiu et al. | 455/522 |
| 7,620,004 B2 * | 11/2009 | Brueck et al. | 370/317 |
| 7,751,843 B2 * | 7/2010 | Butala | 455/522 |
| 7,916,681 B2 * | 3/2011 | Andersson et al. | 370/318 |
| 2006/0262754 A1 * | 11/2006 | Andersson et al. | 370/332 |

FOREIGN PATENT DOCUMENTS

| | | |
|---|---|---|
| WO | 2006/117629 | 11/2006 |
| WO | 2006/122779 | 12/2006 |

OTHER PUBLICATIONS

Philips et al., "Introduction of F-DPCH without pilot field," 3GPP TSG-RAN WG1 Meeting #40, R1-050179 (Feb. 14-18, 2005).

* cited by examiner

*Primary Examiner* — Vibol Tan
(74) *Attorney, Agent, or Firm* — Volpe and Koenig, P.C.

(57) ABSTRACT

A method and apparatus for performing closed loop transmit power control of a fractional dedicated physical channel (F-DPCH) are disclosed. Transmit power control (TPC) symbols on an F-DPCH and common pilot channel (CPICH) symbols are received. A short term signal power estimate is calculated using the TPC symbols, and a short term noise power estimate is calculated using the CPICH symbols. A short term signal-to-interference ratio (SIR) on the F-DPCH is calculated. A long term signal power estimate and a long term noise power estimate are calculated using the TPC symbols. A long term SIR is calculated and compared to a TPC quality target. An SIR target is adjusted based on comparison of the long term SIR to the TPC quality target. The short term SIR is compared to the SIR target and a TPC command is generated based on comparison of the short term SIR to the SIR target.

8 Claims, 1 Drawing Sheet

METHOD AND APPARATUS FOR PERFORMING CLOSED-LOOP TRANSMIT POWER CONTROL FOR FRACTIONAL DEDICATED PHYSICAL CHANNEL

CROSS REFERENCE TO RELATED APPLICATIONS

This application claims the benefit of U.S. provisional application No. 61/031,465 filed Feb. 26, 2008, which is incorporated by reference as if fully set forth.

FIELD OF INVENTION

This application is related to wireless communications.

BACKGROUND

A wireless transmit/receive unit (WTRU) and a network perform transmit power control in order to adjust the transmit power level in an optimal level. Both an inner loop power control and an outer loop power control are performed for closed loop transmit power control. The inner loop power control generates a transmit power control (TPC) command based on a signal-to-interference ratio (SIR) measurement and an SIR target. The outer loop power control adjusts the SIR target based on block error rate (BLER) measurements.

The third generation partnership project (3GPP) has introduced high speed downlink packet access (HSDPA). In HSDPA, every user is allocated a dedicated physical channel (DPCH) in both uplink and downlink directions to exchange higher layer signaling information between a WTRU and a network. As there can be a large number of users in a cell, this might lead to a waste of the channelization codes in the downlink. In order to save such channelization codes, a fractional dedicated physical channel (F-DPCH) has been introduced.

An F-DPCH is a special downlink channel carrying only TPC commands generated at layer 1. Several HSDPA users share the same F-DPCH channelization code, and TPC commands for several users are time-multiplexed onto one F-DPCH channelization code. However, the F-DPCH does not carry any transport channels. Therefore, the outer loop power control cannot adjust the SIR target based on the transport block BLER on the F-DPCH.

SUMMARY

A method and apparatus for performing closed loop transmit power control of an F-DPCH are disclosed. TPC symbols on an F-DPCH and common pilot channel (CPICH) symbols are received. A short term signal power estimate is calculated using the TPC symbols, and a short term noise power estimate is calculated using the CPICH symbols. A short term SIR on the F-DPCH is then calculated by dividing the short term signal power estimate with the short term noise power estimate. A long term signal power estimate and a long term noise power estimate are calculated using the TPC symbols. A long term SIR is then calculated by dividing the long term signal power estimate with the long term noise power estimate. The long term SIR is compared to a TPC quality target, and an SIR target is adjusted based on comparison of the long term SIR to the TPC quality target. The short term SIR is compared to the SIR target and a TPC command is generated based on comparison of the short term SIR to the SIR target.

BRIEF DESCRIPTION OF THE DRAWING

A more detailed understanding may be had from the following description, given by way of example in conjunction with the accompanying drawing wherein.

DETAILED DESCRIPTION

Figure 1:
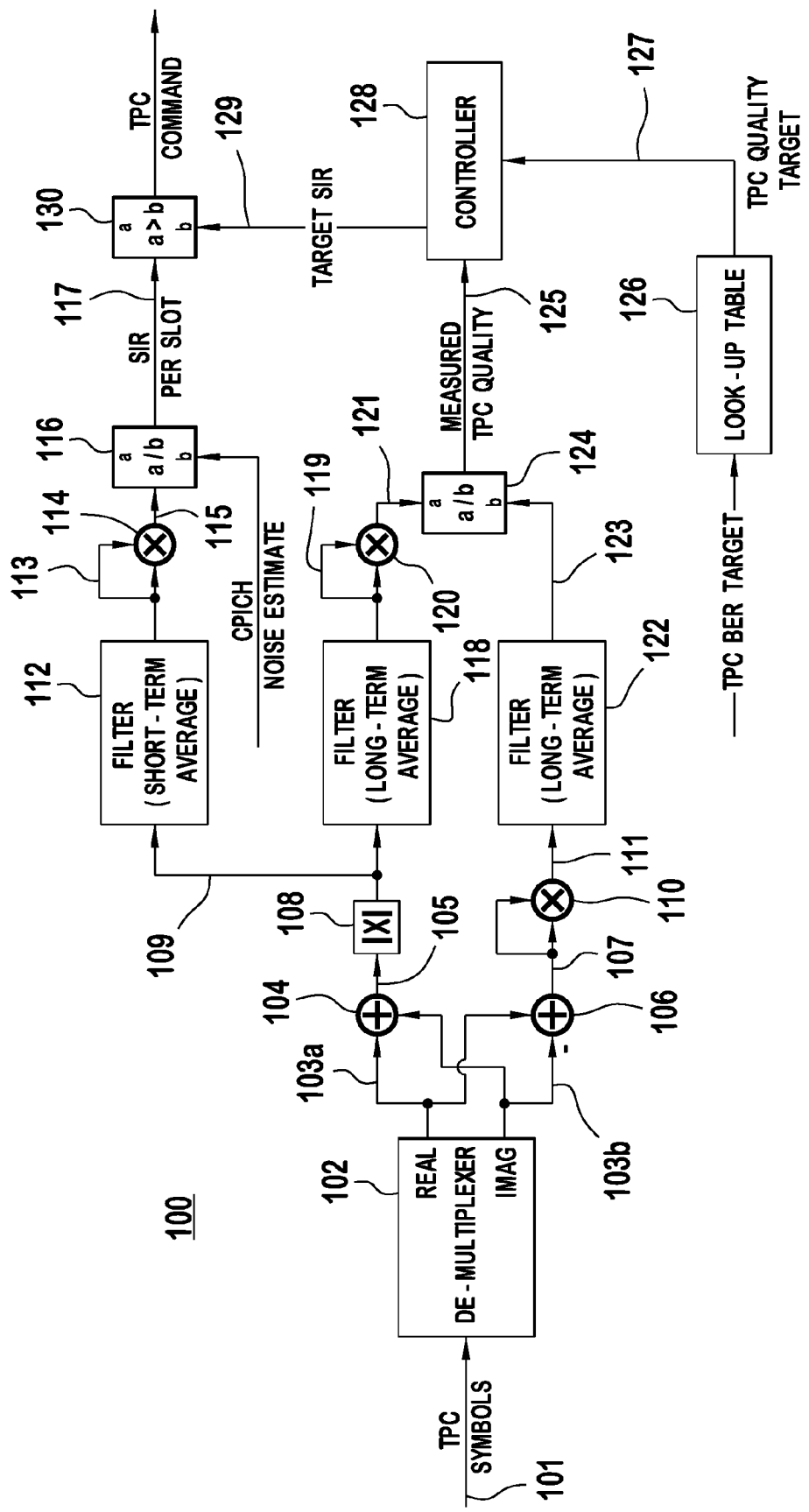
FIG. 1 is a diagram of an example apparatus for performing closed-loop transmit power control for an F-DPCH in accordance with one embodiment.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The main function of the transmit power control procedure for F-DPCH is to maintain a given quality on the received uplink power control TPC commands. This is achieved by using a combination of a fast inner loop power control and a slow outer loop power control. The inner loop generates the downlink TPC commands by comparing the measured F-DPCH TPC SIR per slot with the target SIR set by the outer loop power control.

FIG. 1 is a diagram of an example apparatus 100 for performing closed-loop transmit power control for an F-DPCH in accordance with one embodiment. The apparatus 100 includes a de-multiplexer 102, adders 104, 106, an absolute operation unit 108, squaring units 110, 114, 120, filters 112, 118, 122, dividers 116, 124, a comparator 130, a look-up table (LUT) 126, and a controller 128.

Received TPC symbols 101 over the F-DPCH are de-multiplexed to real parts 103a and imaginary parts 103b by de-multiplexer 102. A sum of the real part 103a and the imaginary part 103b is generated by adder 104. The signal power estimate per slot for the inner loop power control is obtained by adding the real part 103a and imaginary part 103b of the TPC symbols on the F-DPCH. An absolute operation is performed on the sum value 105 by absolute operation unit 108. The absolute sum 109 is filtered over a short period of time, (e.g., few timeslots), by filter 112. The filtered value 113 is squared by squaring unit 114. The squared value 115 is divided by a noise power estimate (CPICH noise estimate) by divider 116 to generate an SIR per slot 117.

The noise power estimate is obtained using CPICH symbols. Since there are more CPICH symbols per slot than TPC symbols, the noise power estimate is more accurate. Using CPICH noise power for inner loop power control would allow for the inner loop to be more responsive to signal fading and channel variations. Further, since the F-DPCH shares the same spreading factor and scrambling code as the CPICH, the statistical noise estimates of the F-DPCH and the CPICH would be identical. However, the inner loop SIR estimate is inherently prone to bias and error because of the fewer number of TPC symbols used to make the signal power estimate. The outer loop is responsible for correcting the bias by setting the target SIR appropriately.

The outer loop achieves this by making more accurate SIR measurements on F-DPCH over a much longer period of time. A signal power estimate for the outer loop power control is obtained by adding the real and imaginary parts of the TPC symbols followed by a long term smoothing filter and a squaring operation. A noise power estimate for the outer loop power control is obtained by taking the difference of the real and imaginary parts of the TPC symbols followed by a squaring operation and a long term smoothing filter.

The absolute sum value 109 is filtered by filter 118 over a longer period of time. The filtered output 119 from filter 118 is squared by squaring unit 120. A difference of the real part 103a and the imaginary part 103b of the TPC symbols on the F-DPCH is generated by adder 106. The difference value 107 is squared by squaring unit 110, and the squared value 111 is filtered by filter 122 over a longer period of time. The squared value 121 from squaring unit 120 is divided by the filtered output 123 from filter 122 by divider 124 to generate a measured TPC quality value 125, which is used as a measure for outer loop TPC quality.

A TPC BLER target value is mapped to a TPC quality target value using an LUT 126. The TPC BLER target is a configurable parameter. The controller 128 compares the measured TPC quality value 125 to the TPC quality target value 127. If the measured TPC quality value 125 is below the TPC quality target value 127, the controller 128 increases the target SIR 129. If the measured TPC quality value 125 is not below the TPC quality target value 127, the controller 128 decreases the target SIR 129.

The SIR per slot 117 is compared to the target SIR 129 by comparator 130 and a TPC command for the F-DPCH is generated based on the comparison result.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for performing closed loop transmit power control of a fractional dedicated physical channel (F-DPCH), the method comprising:

receiving transmit power control (TPC) symbols on an F-DPCH and common pilot channel (CPICH) symbols;

calculating a short term signal power estimate using the TPC symbols;

calculating a short term noise power estimate using the CPICH symbols;

calculating a short term signal-to-interference ratio (SIR) on the F-DPCH by dividing the short term signal power estimate with the short term noise power estimate;

calculating a long term signal power estimate using the TPC symbols;

calculating a long term noise power estimate using the TPC symbols;

calculating a long term SIR by dividing the long term signal power estimate with the long term noise power estimate;

comparing the long term SIR to a TPC quality target;

adjusting an SIR target based on comparison of the long term SIR to the TPC quality target;

comparing the short term SIR to the SIR target; and generating a TPC command based on comparison of the short term SIR to the SIR target.

2. The method of claim 1 wherein a block error rate target is mapped to the TPC quality target using a look-up table.

3. The method of claim 1 wherein the short term signal power estimate and the long term signal power estimate are calculated by adding real parts and imaginary parts of the TPC symbols.

4. The method of claim 1 wherein the long term noise power estimate is calculated using a difference of real parts and imaginary parts of the TPC symbols.

5. An apparatus for performing closed loop transmit power control of a fractional dedicated physical channel (F-DPCH), the apparatus comprising:

a receiver configured to receive transmit power control (TPC) symbols on an F-DPCH and common pilot channel (CPICH) symbols;

a first signal power estimate calculation unit configured to calculate a short term signal power estimate using the TPC symbols;

a first noise power estimate calculation unit configured to calculate a short term noise power estimate using the CPICH symbols;

a first signal-to-interference ratio (SIR) calculation unit configured to calculate a short term SIR on the F-DPCH by dividing the short term signal power estimate with the short term noise power estimate;

a second signal power estimate calculation unit configured to calculate a long term signal power estimate using the TPC symbols;

a second noise power estimate calculation unit configured to calculate a long term noise power estimate using the TPC symbols;

a second SIR calculation unit configured to calculate a long term SIR by dividing the long term signal power estimate with the long term noise power estimate;

a controlling unit configured to compare the long term SIR to a TPC quality target and adjust an SIR target based on comparison of the long term SIR to the TPC quality target; and a TPC command generator configured to compare the short term SIR to the SIR target and generate a TPC command based on comparison of the short term SIR to the SIR target.

6. The apparatus of claim 5 further comprising:
a look-up table for mapping a block error rate target to the TPC quality target.

7. The apparatus of claim 5 wherein the short term signal power estimate and the long term signal power estimate is calculated by adding real parts and imaginary parts of the TPC symbols.

8. The apparatus of claim 5 wherein the long term noise power estimate is calculated using a difference of real parts and imaginary parts of the TPC symbols.

* * * * *